SILICON CAPACITOR

Filed Sept. 25, 1962

INVENTORS
John L. Sprague
Otto J. Wied
BY Connolly and Hutz
ATTORNEYS

3,149,399
SILICON CAPACITOR

John L. Sprague and Otto J. Wied, Williamstown, Mass., assignors to Sprague Electric Company, North Adams, Mass., a corporation of Massachusetts Filed Sept. 25, 1962, Ser. No. 226,082
13 Claims. (Cl. 29—25.42)

This invention relates to silicon capacitors in which the dielectric is silicon dioxide, and more particularly to thin body silicon dioxide capacitors.

A capacitor dielectric composed of silicon dioxide has unique advantages, including high temperature resistance. However, the dielectric constant of silicon dioxide is of a relatively low value. One method of overcoming this disadvantage may be by the reduction of the thickness of the silicon dioxide dielectric layer. Previously the silicon dioxide dielectric layers have suffered from the disadvantage of a decrease of field strength when very thin layers are used. Hence, silicon dioxide capacitors have been limited to small devices of low capacitance and low voltage ratings.

It is an object of this invention to provide a silicon dioxide capacitor having high capacity and high voltage capabilities.

It is an object of this invention to provide a means for producing a silicon dioxide body for a capacitor having an increased surface area and an improved dielectric.

These and other objects will become more apparent from the following description taken together with the accompanying drawings in which.

Figures 1, 2, 3, 4, 5, 6, 7:
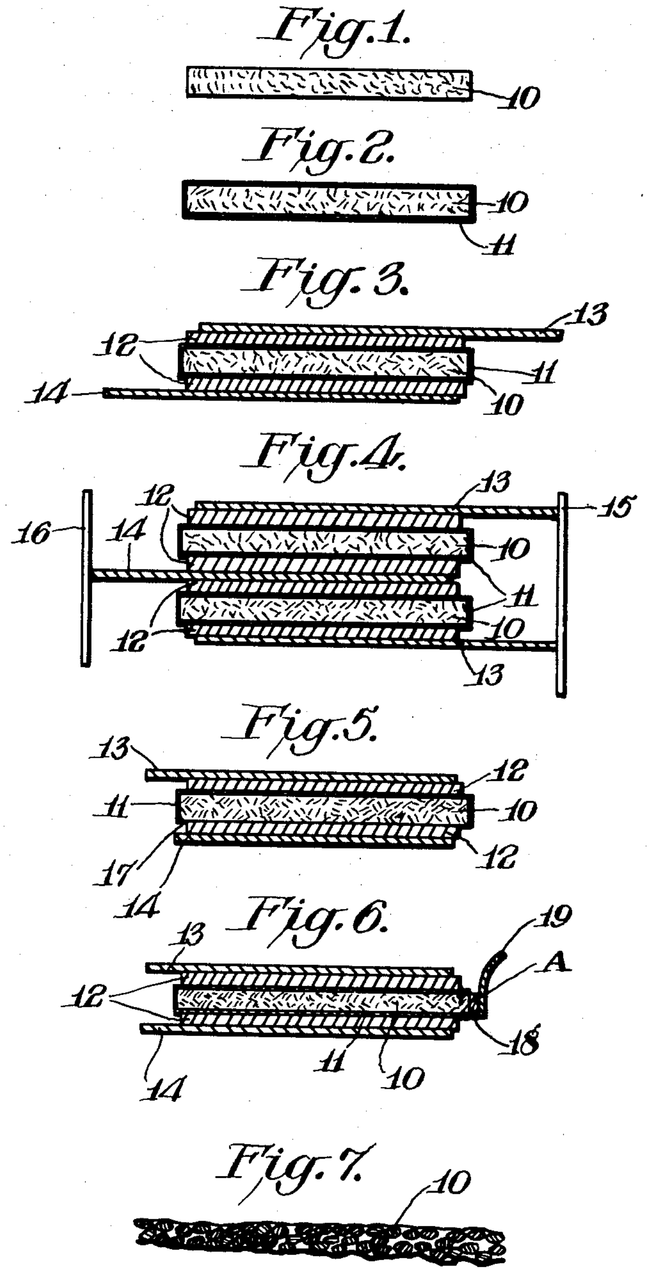
FIGURE 1 is a section view of a silicon body for processing according to this invention.
FIGURE 2 is a sectional view of the silicon body of FIGURE 1 provided with a dielectric film.
FIGURE 3 is a sectional view of the dielectric body of FIGURE 2 provided with electrodes and terminal tabs.
FIGURE 4 is a sectional end view of a stack of capacitor bodies and electrical conducting elements according to this invention.
FIGURE 5 is a sectional view of a modified capacitor body of this invention.
FIGURE 6 is a sectional view of a further modification of a capacitor body according to this invention.
FIGURE 7 is a sectional view of a portion of a capacitor body showing an embodiment of this invention.

Referring to FIGURE 1, a disc 10 of silicon may be made up either of single or polycrystalline semiconductor quality silicon. The conductivity type and the doping level of the silicon form no part of this invention; even intrinsic silicon is suitable. As shown in FIGURE 2 a silicon dioxide layer 11 is produced on the disc 10 by suitable means and method. For example, the silicon dioxide layer 11 may be formed from the silicon body 10. Thermal oxidation of the silicon disc 10 in steam forms a layer of amorphous silica over the entire surface of the disc 10. By another suitable means the silicon disc 10 may be made the anode in an electrolytic bath, and silicon dioxide formed on the outer surface of the disc 10 by anodization through electrolysis. In still another method, thermal oxidation and anodization may be combined by first conducting either oxidation method and then completing the dielectric film formation by the other method.

The silicon dioxide layer 11 may be applied to the silicon disc 10 by a method which consists of passing an organo-oxysilane over silicon disc 10 at around 750° C. The silicon dioxide which is thus formed deposits out on the silicon disc 10 as an adherent flexible layer 11 which is in intimate contact with the surface of the disc 10.

A typical organo-oxy-silane decomposition reaction for producing a deposited layer may be as follows in the case of ethyltriethoxysilane:

$$C_2H_5\text{–}Si(OC_2H_5)_3 \xrightarrow{\Delta} SiO_2 + C_xH_y + \text{[possibly some SiO and C]}$$

The decomposition of silanes having 3 or 4 oxygen atoms per molecule is preferred for optimum results. Other suitable silanes include tetraethoxysilane, amyltriethoxysilane, vinyltriethoxysilane, phenyltriethoxysilane, dimethyldiethoxysilane, and diphenyldiethoxysilane.

Another suitable means of application of the silicon dioxide is by sputtering silica onto the disc 10. Another method is the application of a layer of silicon monoxide to the body surface and the oxidation of the silicon monoxide to silicon dioxide in an oxidizing atmosphere.

In the modification of FIGURE 7 the silicon body 10 is provided with an irregular surface to thereby increase the surface area. One method of increasing the surface is etching of the silicon with an appropriate etchant known to the silicon semiconductor art. For example, a preferred etching solution is 3 parts by volume of hydrofluoric acid, 3 parts nitric acid, and 3 parts acetic acid. This preferred etch provides about a 10% increase in surface area of the silicon body. Another suitable etchant is hydrogen bromide gas or chlorine gas in organ. A silicon oxide film 11 may be then formed on the body 10 by any of the suitable methods described above.

FIGURE 2 illustrates a silicon oxide film 11 on a silicon body 10 which may be either the conventional body of FIGURE 1 or the etched body of FIGURE 7. FIGURE 3 illustrates the oxidized body 10 with capacitor electrode plates 12 applied to the oxide film 11 by metallization procedures. Any one of a number of recognized capacitor electroding techniques are suitable. For example, each plate 12 may be metallized on the irregular surface of the oxide film 11 by using a masking technique. Alternatively plates 12 may be made from a layer of silver mixed with a suitable binder applied to the film 11 on the body 10 and treated to final form as by firing. In addition, the plates may be applied by vapor deposition from an evaporated source in a vacuum or by decomposition of metal carbonyls. Other suitable electrode material may be suitably applied as by screen-printing on the oxide 11. The conductive electrode material may be applied in paste or liquid form. Spraying metallic paint is one suitable technique. In screen-printing the electrode on the surface can be applied with a squeegee. Another suitable technique is electroless deposition.

One of the plates 12 is provided with a metal foil tab 13 and the opposite plate 12 is provided with a metal foil tab 14. The metal foil tabs 13 and 14 bear on the plates 12. Other suitable means may be provided for making electrical connection to the plates in keeping with the advantageous compactness in size of this invention.

The capacitor carrying respective opposing electrode plates 12 produced according to this invention and illustrated in FIGURE 3 may be combined with similar capacitors, and this group may be then formed into a stack of capacitors to provide a selected value of capacitance. In FIGURE 4 such a stack of two silicon bodies having silicon dioxide surface layers is shown. Two bodies 10 are shown each provided with a pair of opposing plates 12. One of the metal foil tabs 13 is brought into contact with one of the metal plates 12 on each of the bodies 10. The metal foil tab 14 is brought into contact with the opposing other plate 12 on each of the respective bodies 10. The tabs 13 are connected to a terminal wire 15 and the tab 14 to a terminal wire 16. This stacking can be augmented to any degree to provide whatever amount of capacitance is desired. The tab metal foils 13 and 14 inserted between the plates 12 do not substantially expand the size of the stack and they form a good electrical contact with the plates 12. The plates 12 are connected to an external circuit by connecting the pair of lead-wires 15 and 16 to opposite polarities. The tabs 13 and 14 of a pile of stacked units are respectively connected by the common connections of wires 15 and 16 so that the sections are connected in parallel. It will be understood that capacitor stacks of this invention may be connected together in other configurations known to the stacked capacitor art; e.g., a series connected stack for operation at higher voltages. In a like manner it will be understood that the capacitor stacks of this invention are not limited in the number of capacitors that may be joined.

It is a feature of silicon bodies having a silicon dioxide surface layer used for capacitors that they can be provided in a variety of physical configurations to provide a variety of electrical arrangements. For example, by removal of silicon dioxide from selected portions of the body, it is possible to provide modified dielectric bodies.

FIGURE 5 shows a procedure for producing one such configuration. In this method the silicon body 10 is covered with the silicon dioxide skin 11 in accordance with this invention. The oxide is then removed from one surface of the body 10 to lay bare a surface of elemental silicon. The silicon oxide may be removed by a suitable method, such as abrading. Electrodes 12 are then applied to the exposed silicon surface 17 and to the oxide film 11 respectively. Electrode 12 on the bare silicon surface is utilized only as a contact medium for the tab 14, and could be omitted by applying tab 14 directly to silicon surface 17. The FIGURE 5 arrangement provides twice the capacity of that provided otherwise by a body of this size.

Similarly, a single body 10 can be used to provide separate capacitors with a saving in space and yet other advantages. One arrangement of a plurality of capacitors is illustrated in FIGURE 6. The oxidized body 10 has the oxide film 11 removed from one end or edge at A and an electrode 18 is applied. Electrodes 12 are applied to diametric surfaces of body 10 on the oxide film 11. Tabs 13 and 14 are attached to the respective opposing electrode plates 12, and a tab 19 to the electrode 18. The tabs 13, 14, and 19 provide connections for two capacitors in parallel with the silicon body 10 acting as an electrode.

The silicon dioxide dielectric film capacitors produced according to the various means and methods described above provide an increase in capacitances over that provided previously in silicon capacitors of equivalent size. Further, the capacitors of this invention exhibit high stability with long life and over useful ranges of temperature. In addition, the capacitors of this invention exhibit high voltage and high capacitance capabilities with a loss angle that is low over a wide frequency range.

It will be understood that the above-described embodiments are illustrative of the invention. The silicon dioxide surface layer is formed on a silicon body by the described methods such as oxidizing in steam or anodization or a combination of these methods. The silicon dioxide surface layer according to this invention provides a unit of increased capacitance by first etching the silicon body, or by stacking the capacitor units, or by doubling or quadrupling the capacitance through the means illustrated in the FIGURES 5 and 6. In a like manner, it will be understood that specialized capacitors within the scope of this invention are produced by stacking the so-called "half-capacitors" of FIGURE 5 or the "quarter-capacitors" of FIGURE 6.

It will be further understood that the above-described embodiments of this invention are intended merely as illustrations and that other embodiments and further modifications come within the spirit of this invention which is defined by the following claims.

What is claimed is:

1. The method of making an electrical capacitor having a dielectric film of silicon dioxide which comprises providing a body of silicon, treating at least one of the surfaces of said body to provide a thin silicon dioxide film thereon, subsequently applying capacitor electrodes to opposed surfaces of said body including said at least one surface, and attaching electrical connections to said electrodes.

2. The method of making an electrical capacitor having a dielectric film of silicon dioxide which comprises providing a body of silicon, electrolytically anodizing said silicon body to provide a thin silicon dioxide film on its surfaces, subsequently applying capacitor electrodes to said silicon dioxide film on opposed surfaces of said body, and attaching electrical connections.

3. The method of making an electrical capacitor having a dielectric film of silicon dioxide which comprises providing a body of silicon, providing a thin silicon dioxde film on the surfaces of said body by electrolytically anodizing and heating in an oxidizing atmosphere, subsequently applying capacitor electrodes to said silicon dioxide film on surfaces of said body and attaching electrical connections.

4. The method of making an electrical capacitor which comprises providing a flat body of silicon, removing portions of said body to provide irregular surfaces thereon, subsequently treating at least one of the irregular surfaces to provide a thin silicon dioxide, subsequently applying capacitor electrodes to the silicon dioxide on diametric irregular surfaces of said flat body to form a capacitor body, and attaching electrical connections to said electrodes.

5. In the method of making a capacitor of claim 4, wherein said removing is by etching said body with an etchant selected from the group of hydrofluoric, acetic, nitric acid, chlorine gas with argon, and hydrogen bromide gas with argon.

6. The method of making an electrical capacitor which comprises providing a flat body of silicon, etching substantial portions of said body to provide irregular surfaces thereon, subsequently oxidizing said irregular surfaces to provide a thin silicon dioxide film, subsequently applying capacitor electrodes to the silicon dioxide on diametric irregular surfaces of said flat body to form a capacitor body, and attaching electrical connections to said electrodes.

7. The method of preparing a stack capacitor which comprises providing a plurality of silicon wafers, producing surfaces of silicon dioxide on said wafers, metallizing said surfaces to provide electrodes thereon to form a capacitor body each wafer, and connecting an arranged plurality of said electroded wafers in a stack with common connections between adjacent electrodes.

8. The method of preparing a stack capacitor which comprises providing a plurality of silicon bodies, etching said bodies to provide irregular surfaces, subsequently oxidizing said irregular surfaces to provide irregular surfaces of silicon dioxide on said bodies, metallizing said silicon dioxide surfaces to provide electrodes thereon to form a capacitor body of each oxidized body, and connecting an arranged plurality of said electroded capacitor bodies in a stack with common connections between adjacent electrodes.

9. A process for producing a multiple fixed capacitor unit comprising the steps of providing a silicon body with a silicon dioxide dielectric layer, removing said layer from a portion of said body and applying an electrode to the oxide-removed-surface, applying electrodes to said silicon dioxide layer, and attaching electrical connections to said electrodes.

10. A process for producing a multiple fixed capacitor unit comprising providing a plurality of silicon bodies each with a silicon dioxide layer, removing said layer from a portion of said bodies, applying electrodes to the oxide-removed surface and to the silicon dioxide layer of said bodies to form a capacitor of each body, and connecting an arranged plurality of said electroded bodies in a stack with common connections between adjacent electrodes.

11. The method of making an electrical capacitor having a dielectric film of silicon dioxide on a silicon substrate which comprises providing a silicon substrate, removing portions of said substrate to provide irregular surfaces thereon, subsequently providing the irregular surfaces with a thin silicon dioxide film, subsequently applying capacitor electrodes to the silicon dioxide film on diametric irregular surfaces of said coated substrate to form a capacitor body, and attaching electrical connections to said electrodes.

12. A method of making a capacitive device which comprises sputtering silica onto a silicon body to provide an adherent layer of silicon dioxide in intimate contact on said silicon body, applying at least one electrode to said silicon dioxide layer and at least one other electrode to said body, and attaching leads to said electrodes.

13. A method of making a capacitive device which comprises applying a layer of silicon monoxide to the surface of a silicon body and oxidizing the silicon monoxide to silicon dioxide in an oxidizing atmosphere to form an adherent layer of silicon dioxide in intimate contact on said silicon body, applying at least one electrode to said silicon dioxide layer and at least one other electrode to said body, and attaching leads to said electrodes.

References Cited in the file of this patent

UNITED STATES PATENTS

| | | |
|---|---|---|
| 2,748,325 | Jenny | May 29, 1956 |
| 2,899,344 | Atalla | Aug. 11, 1959 |

UNITED STATES PATENT OFFICE

CERTIFICATE OF CORRECTION

Patent No. 3,149,399 September 22, 1964

John L. Sprague et al.

It is hereby certified that error appears in the above numbered patent requiring correction and that the said Letters Patent should read as corrected below.

Column 2, line 24, for "organ" read -- argon --; column 4, line 48, after "body" insert -- of --.

Signed and sealed this 19th day of January 1965.

(SEAL)
Attest:

ERNEST W. SWIDER
Attesting Officer

EDWARD J. BRENNER
Commissioner of Patents